(12) United States Patent
Furuhashi et al.

(10) Patent No.: US 6,392,643 B1
(45) Date of Patent: May 21, 2002

(54) IMAGE GENERATION APPARATUS

(75) Inventors: Makoto Furuhashi; Masayoshi Tanaka, both of Kanagawa; Masakazu Suzuoki, Tokyo; Teiji Yutaka, Kanagawa, all of (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 08/414,803

(22) Filed: Mar. 31, 1995

(30) Foreign Application Priority Data

Apr. 8, 1994 (JP) .............................................. 6-095716

(51) Int. Cl.⁷ .............................................. G06F 15/00
(52) U.S. Cl. ....................................................... 345/419
(58) Field of Search ................................ 395/135, 133, 395/119; 345/419, 619, 620, 629, 630, 631, 420

(56) References Cited

U.S. PATENT DOCUMENTS 4,823,281 A * 4/1989 Evangelisti et al. ......... 364/518
5,335,318 A * 8/1994 Kirk ............................ 395/131
5,469,541 A * 11/1995 Kingman et al. ............ 395/158

FOREIGN PATENT DOCUMENTS

EP  0 430 501 A2  6/1991
EP  0 452 796 A2  10/1991
WO  WO 94/06111  3/1994

OTHER PUBLICATIONS

Computer Technology, vol. 10, No. 16, Jan. 1991, pp. 108–113m XP000204583, S. Knight, "Real time visual Simulation Clues and Scene Anti–Aliasing", pp. 112–113, "Anti–Aliasing Methods".

* cited by examiner

Primary Examiner—Phu K. Nguyen
(74) Attorney, Agent, or Firm—Lerner, David, Littenberg, Krumholz & Mentlik, LLP

(57) ABSTRACT

There is provided an image generation apparatus which requires a small amount of data for a draw command and a small capacity for a mixing ratio memory and which is capable of performing full transparent and full opaque processes utilizing a semitransparent process at high speed.

The image generation apparatus includes a read circuit for reading the pixel data of the image which has been previously drawn from a frame buffer, a mixing circuit for mixing the pixel data read from the frame buffer and the pixel data of the corresponding position where the next drawing operation is to be performed in a specified mixing ratio, a write circuit for writing pixel data as a result of the mixing at the mixing circuit in the corresponding pixel position in the frame buffer, a mixing ratio memory portion for storing a plurality of mixing ratios, and an index memory for selecting the mixing ratio to be supplied to the mixing circuit from the mixing ratio memory portion according to mixing ratio selection information included in the draw command.

12 Claims, 9 Drawing Sheets

FIG. 7

| INDX | MIXING RATIO $\beta$ |
|---|---|
| 0 | 0 |
| 1 | 0.25 |
| 2 | 0.5 |
| 3 | 0.6 |
| 4 | 0.7 |
| ⋮ | ⋮ |
| N | 1 |

INDEX NO.

MIXING RATIO TABLE

INDEX NO.

| INDX | MIXING RATIO $\beta$ |
|---|---|
| 0 | 0.25 |
| 1 | 0.5 |
| 2 | 0.6 |
| 3 | 0.7 |
| ⋮ | ⋮ |
| M | 0.9 |

IMAGE GENERATION APPARATUS

BACKGROUND OF THE INVENTION

1. Field of the Invention

The present invention relates to an image generation apparatus suitable for use with apparatuses utilizing computer graphics such as video game machines and graphic computers which must perform a high level of visualization using limited hardware resources. More particularly, the present invention relates to the so-called semitransparent process.

2. Description of the Related Art

In the art of computer graphics, the systems normally referred to as 3D (three-dimensional) graphics systems draw an image of an object which gives the sense of reality (hereinafter an object to be drawn will be simply referred to as an object) by first dividing the surface of the object into a plurality of polygons ("polygons" are the smallest units of figures treated by a drawing device (triangles and quadrangles)) and by drawing those polygons sequentially in a frame memory associated with a monitor display screen (herein after referred to as a frame buffer) to reconstruct an image which has a three-dimensional appearance.

In a normal image generation apparatus of this type, a dedicated drawing device is provided between the CPU and frame buffer in order to improve the processing speed. During the generation of an image, the CPU does not directly access the frame buffer, but generates commands (hereinafter simply referred to as draw commands) to draw basic figures such as triangles and quadrangles (polygons) and sends them to the drawing device. The drawing device interprets the draw commands and draws the figures in the frame buffer.

In computer graphics systems, the pixel data (throughout this specification, such data is constituted by, for example, data of three primary colors) of the image which has been previously displayed is mixed with the pixel data of the next image to be drawn in a predetermined ratio to perform a semitransparent process. The semitransparent process is performed by a drawing device, and a semi-transparent process portion of a drawing device has been configured as shown in FIG. 11 in the prior art.

In FIG. 11, 10 designates a frame buffer and 20 designates a drawing device. The drawing device 20 includes a mixing circuit 21 for a semitransparent process, a read circuit 22 for reading pixel data from the frame buffer 10, a write circuit 23 for writing pixel data in the frame buffer 10, a draw command decoding portion 24 for decoding a draw command transmitted to the drawing device 20, an image generation circuit 25 for generating an image in accordance with the draw command decoded by the draw command decoding portion 24, a mixing ratio memory 26, and a control portion 27 for controlling the transparent process as a whole.

A draw command includes the data of mixing ratios which is extracted by the draw command decoding portion 24 and is stored in the mixing ratio memory 26. The mixing ratio memory 26 stores the mixing ratio for each of pixels which constitute the image generated. by the image generation portion 25 based on drawn pixel position information supplied by the image generation portion 25.

The semitransparent process is performed as follows. The read circuit 22 reads the previous pixel data Vm in the pixel position in which drawing is to be performed from the frame buffer 10 and supplies the data to the mixing circuit 21. Data Vc for the pixel to be newly drawn is supplied from the image generation portion 25 to the mixing circuit 21. The mixing ratio a for the pixel to be newly drawn is read from the mixing ratio memory 26 and is supplied to the mixing circuit 21.

In the mixing circuit 21, the pixel data Vm and Vc are mixed in the mixing ratio $\alpha$. Specifically, mixed output pixel data Vo is obtained from a calculation:

$$(1-\alpha)Vm + \alpha Vc = Vo$$

The pixel data as a result of the mixing is written back in the same address as that of the read pixel data Vm in the frame buffer 10 as described above by the write circuit 23.

At this time, the color of the previous pixel remains on the new pixel in accordance with the mixing ratio $\alpha$ and is displayed as a semitransparent color. If the mixing ratio $\alpha=1$, the color is fully opaque and, if the mixing ratio $\alpha=0$, the color is fully transparent.

The applicant has made the following Japanese patent applications which are related to the drawing device according to this application.

05-190763 (filed on Jun. 30, 1993)
05-190764 (filed on Jul. 2, 1993)
05-258625 (filed on Oct. 15, 1993)
06-027405 (filed on Jan. 31, 1994)

Each of the above applications is owned by the assignee of the present invention and is hereby incorporated by reference. (Applications for U.S. patent corresponding to these four Japanese patent applications are pending.)

As described above, in the conventional semitransparent process, a draw command includes the values of mixing ratios $\alpha$ based on which a mixing ratio $\alpha$ is stored in the mixing ratio memory 26 for each pixel. Therefore, when the mixing ratios are minutely set, the number of bits required for the mixing ratios $\alpha$ becomes large. This results in an increase in the amount of data of a draw command which necessitates an increase in the capacity of the mixing ratio memory 26.

In order to simplify the configuration of a drawing device, it is desirable to have the capability of the full transparent and full opaque processes included in the semitransparent process. As described above, however, in the semitransparent process, three steps of processing, i.e., reading from the frame buffer 10, mixing, and writing back in the frame buffer 10, must be performed for each pixel, and this results in a problem in that the processing time becomes relatively long.

It is an object of the present invention to provide an image generation apparatus which does not necessitate an increase in the amount of data of a draw command and which can employ a mixing ratio memory of a small capacity.

It is another object of the present invention to provide an image generation apparatus capable of performing full transparent and full opaque processes utilizing a semitransparent process at high speed.

SUMMARY OF THE INVENTION

In order to solve the above-described problem, according to the present invention, there is provided an image generation apparatus wherein draw commands generated by a CPU 42 are transferred to a drawing device portion 61 which generates an image on a frame buffer 63 by performing drawing sequentially in accordance with the draw commands, the drawing device portion 61 comprising a read means 102 for reading the pixel data of the image which has been previously drawn from the frame buffer 63, a mixing circuit 101 for mixing the pixel data read from the frame buffer 63 and the pixel data of the corresponding position where the next drawing operation is to be performed in a specified mixing ratio, a write means 103 for writing pixel data as a result of the mixing at the mixing circuit 101 in the corresponding pixel position in the frame buffer 63, a mixing ratio memory portion 106 for storing a plurality of the mixing ratios, and a selection means 107 for selecting the mixing ratio to be supplied to the mixing circuit 101 from the mixing ratio memory portion 106 according to mixing ratio selection information included in the draw command.

According to another aspect of the present invention, there is provided an image generation apparatus wherein draw commands generated by a CPU 42 are transferred to a drawing device portion 61 which generates an image on a frame buffer 63 by performing drawing sequentially in accordance with the draw commands, the drawing device portion 61 comprising a means 102 for reading the pixel data of the image which has been previously drawn from the frame buffer 63, a mixing circuit 101 for mixing the pixel data read from the frame buffer 63 and the pixel data of the corresponding position where the next drawing operation is to be performed in a specified mixing ratio, a write means 103 for writing pixel data as a result of the mixing at the mixing circuit 101 in the corresponding pixel position in the frame buffer 63, a mixing ratio memory portion 106 for storing the mixing ratio supplied to the mixing circuit 101, a flag determination means 109 for extracting a flag associated with the mixing process included in the draw command and for determining the state of the flag, and a control means 18 for performing control based on the result of the determination by the flag determination means 109 such that, if the flag is in one state, the reading of the pixel data from the frame buffer 63 by the read means 102 is omitted and the pixel data of the corresponding position where the next drawing operation is to be performed is written as it is in the corresponding pixel position in the frame buffer 63 by the write means 103 and such that, if the flag is in another state, the reading of the pixel data from the frame buffer 63 by the read means 102 and the writing into the frame buffer 63 by the write means 103 are omitted.

According to the present invention having the configuration as described above, information on mixing ratios is stored in the mixing ratio memory portion 106 of the drawing device portion 61 in advance. A draw command includes selection information indicating the mixing ratios to be used among those stored in the mixing ratio memory portion 106. The mixing ratios to be supplied to the mixing circuit 101 are determined based on this selection information. It is only required to prepare this selection information for each pixel. Since this selection information requires only the number of bits that allows selection from the mixing ratios stored in the mixing ratio memory portion 106, the number of bits can be smaller than that in the prior art wherein the mixing ratios themselves must be included in a draw command. This results not only in a decrease in the amount of data in a draw command but also in a reduction in the memory capacity required for the selection of the mixing ratios.

According to the second aspect of the invention, the determination means 109 determines whether the full transparent process (mixing ratio=0) or full opaque process (mixing ratio=1) is to be performed from the flag of one bit included in the draw command.

In the case of the full transparent process, neither the reading of pixel data from the frame buffer 63 by the read circuit 102 nor the writing into the frame buffer 63 by the write circuit 103 is performed. As a result, the full transparent process can be performed at high speed even with a semitransparent processing device having the mixing circuit 101, read circuit 102, and write circuit 103 because the read and write processes are skipped.

In the case of the full opaque process, the reading of pixel data from the frame buffer 63 by the read circuit 102 is not performed and only the writing of new data in the frame buffer by the write circuit 103 is performed. Therefore, the processing speed is improved also in this case because the process of reading pixel data from the frame buffer 63 is skipped.

As described above, according to the present invention, a draw command does not need to include mixing ratios themselves for the semitransparent process but it needs only index data for selecting desired mixing ratios from a mixing ratio table provided in the drawing device portion. This results in a reduction in the number of bits required. In addition, the drawing device portion needs only a memory for storing the mixing ratio table and a memory for storing index data. Therefore, it is possible to use memories of small capacities.

According to the second aspect of the invention, even with a circuit for semitransparent processing, full opaque and full transparent processes can be performed at high speed because the reading of pixel data from the frame buffer can be skipped in the former and the reading of pixel data from the frame buffer and the writing of pixel data back in the frame buffer can be skipped in the latter.

BRIEF DESCRIPTION OF THE DRAWINGS

FIG. 7 illustrates an example of a mixing ratio table according to a first embodiment of the present invention.

DETAILED DESCRIPTION OF PREFERRED EMBODIMENTS

Figure 2:
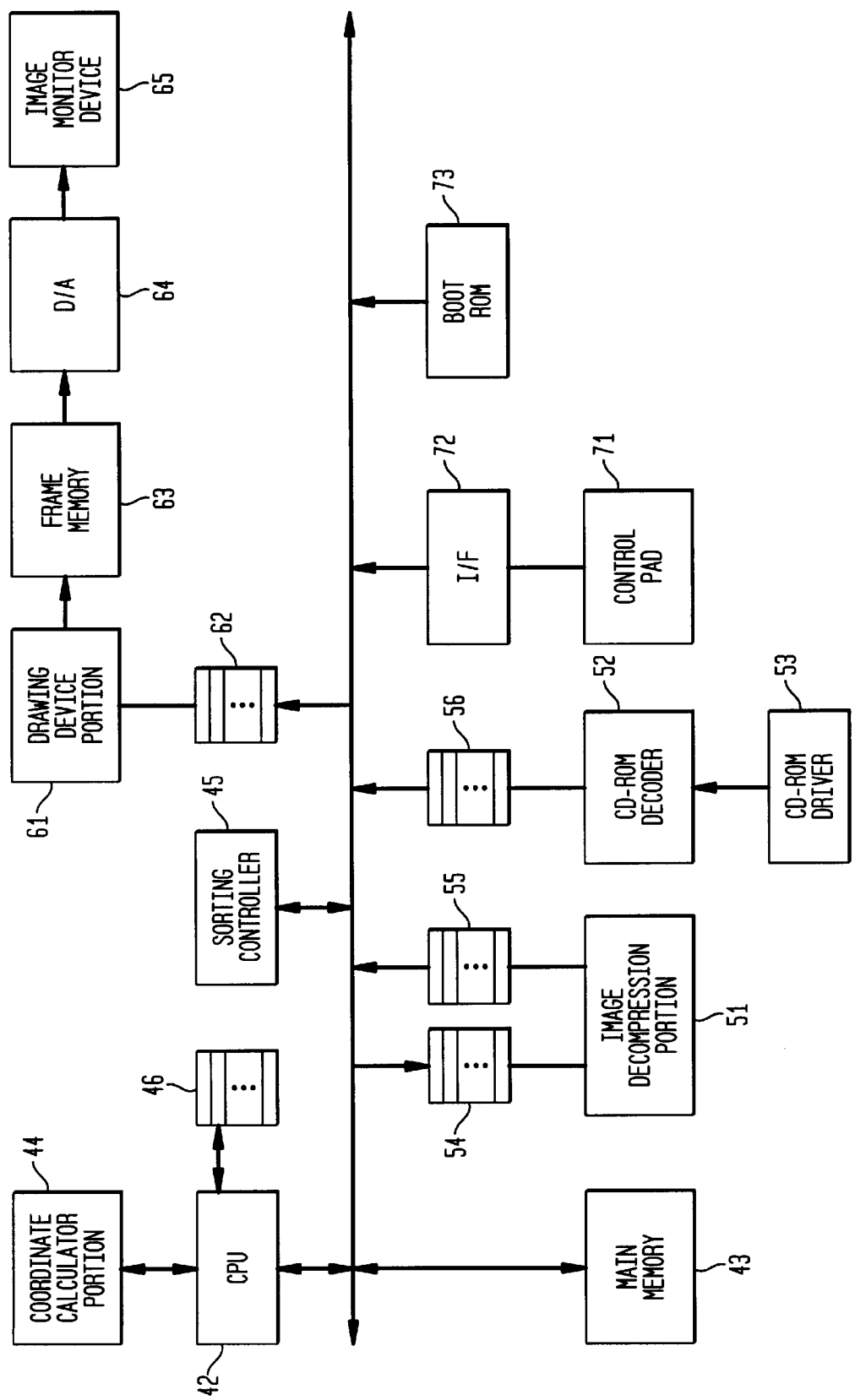
FIG. 2 is a block diagram showing an overall configuration of an embodiment of an image generation apparatus according to the present invention.

An embodiment of the present invention will now be described with reference to the accompanying drawings. FIG. 2 shows an example of a configuration of an image generation apparatus according to an embodiment of the present invention. This is an example the implementation of the invention in a game machine having a 3D graphic function and a dynamic image reproducing function.

In FIG. 2, a CPU 42, a main memory 43, and a sorting controller 45 are connected to a system bus (main bus) 41.

An image decompression device portion 51 is also connected to the system bus 41 through an FIFO (first in first out) buffer memory 54 for input (hereinafter the FIFO buffer memory is simply referred to as an FIFO buffer) and an FIFO buffer 55 for output. Further, a CD-ROM decoder 52 and a drawing device portion 61 are also connected to the system bus 41 through an FIFO buffer 56 and an FIFO buffer 62, respectively.

A control pad 71 as a control input means is also connected to the system bus 41 through an interface 72. In addition, a boot ROM 73 is connected to the system bus 41 in which a program for starting up the game machine is stored.

The CO-ROM decoder 52 is connected to a CD-ROM driver 53 and decodes an application program (e.g., the program of a game) and data recorded on a CD-ROM disc loaded in the CD-ROM driver 53. For example, a CD-ROM disc stores image data for dynamic images and still images which have been subjected to image compression using discrete cosine transformation (DCT) and image data for texture images for modifying polygons. The application program in the CD-ROM disc includes polygon draw commands. The FIFO buffer 56 has a capacity to store one sector of the data recorded on the CD-ROM disc.

The CPU 42 manages the system as a whole. The CPU 42 also performs a part of a process of drawing an object as an aggregate of a multiplicity of polygons. Specifically, the CPU 42 generates draw commands and also generates control commands on the main memory 43, as described later. Also as described later, it creates examples of draw commands on the main memory 43 which are mixtures of draw commands and control commands.

The CPU 42 includes a cache memory 46 which allows some of CPU instructions to be executed without fetching them over the system bus 41. Further, the CPU 42 is equipped with a coordinate calculating portion 44, as an internal coprocessor of the CPU, which performs calculations for converting the coordinates of polygons and calculations of coordinate values for control purposes when draw commands and control commands are created. The coordinate calculating portion 44 performs calculations for three-dimensional coordinate conversion and conversion of three dimensions into two dimensions on a display screen.

Since the CPU 42 incorporates the command cache 46 and the coordinate calculating portion 44 as described above, the processes in the CPU 42 can be performed without using the system bus 41 to some extent, and this increases opportunities to leave the system bus 41 unoccupied.

The image decompression device portion 51 decompresses compressed image data reproduced from a CD-ROM disc and includes hardware for a decoder for decoding Huffman codes, an inverse quantization circuit, and an inverse discrete cosine transformation circuit. The process at the part of the Huffman code decoder may be performed by the CPU 42 on a software basis.

In this embodiment, the image decompression device portion 51 divides one (one frame of) image into small areas each consisting of, for example, 16×16 pixels (hereinafter such an area is referred to as a macro-block) and performs image-decompression-decoding on each macro-block. Data is transferred between this portion and the main memory 43 on a macro-block basis. Therefore, the FIFO buffers 54 and 55 have a capacity to store one macro-block.

A frame memory 63 is connected to the drawing device portion 61 through a local bus 11. The drawing device portion 61 executes draw commands transferred thereto from the main memory 43 through the FIFO buffer 62 and writes the result in the frame memory 63. The FIFO buffer 62 has a memory capacity to store one command.

The frame memory 63 includes an image memory area for storing drawn images, a texture memory area for storing texture images, and a table memory area for storing a color look-up table (or color conversion table) CLUT.

Figure 3:
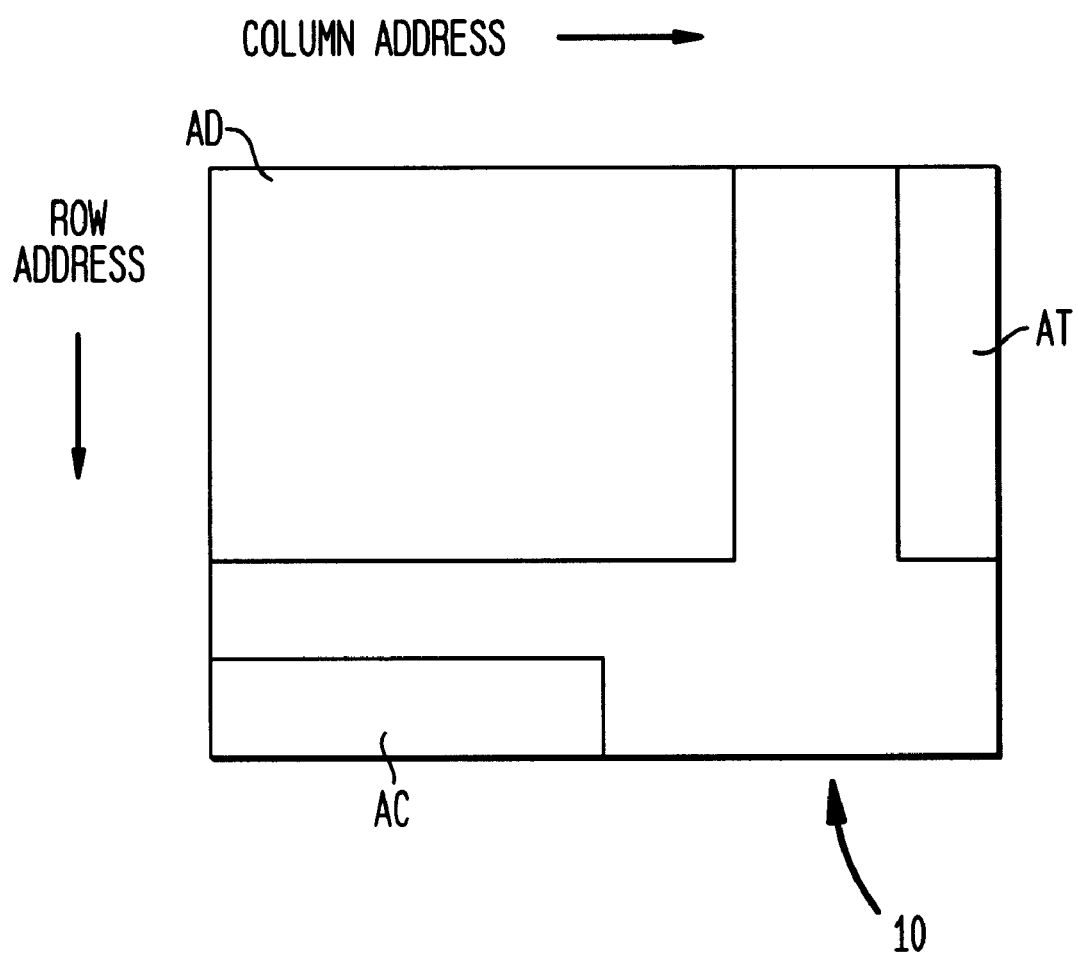
FIG. 3 illustrates a frame memory area of an embodiment of the present invention.

FIG. 3 shows the memory space of the frame memory 63. The frame memory is addressed using two-dimensional addresses, i.e., column and row addresses. In this two-dimensional address space, an area AT is used as the texture memory area. Plural kinds of texture patterns can be provided in this texture area AT. AC represents the table memory area for the color conversion table CLUT.

As described later in detail, the data in the color conversion table CLUT is transferred by the sorting controller 45 from the CD-ROM disc to the frame memory 63 through the CD-ROM decoder 52. The data of the texture images in the CD-ROM is subjected to data-decompression at the image decompression device portion 51 and is transferred to the frame memory 63 through the main memory 43.

In FIG. 3, AD represents an image memory area which includes two frame buffer areas, i.e., an area for drawing and an area for display. In this embodiment, the frame buffer area which is currently used for display is referred to as a display buffer and the area in which drawing is being performed is referred to as a drawing buffer. In this case, while drawing is performed using one of the areas as a drawing buffer, the other is used as a display buffer. When the drawing is completed, the functions of those buffers are switched. The switching of the drawing and display buffers is carried out simultaneously with vertical synchronization when the drawing is completed.

The image data read from the display buffer of the frame memory 63 is output through a D-A converter 64 to an image monitor device 65 to be displayed on the screen thereof.

The sorting controller 45 has functions similar to those of the so-called DMA controller and constitutes a transfer means for transferring image data between the main memory 43 and the image decompression device portion 51 and for transferring a string of draw commands from the main memory 43 to the drawing device portion 61. The sorting controller 45 performs the above-described transfer processes taking advantage of the time intervals when the system bus 41 is not occupied by other devices such as the CPU 42 and the control pad 71 without intervention of the CPU 42. In this case, an arrangement may be made such that the CPU 42 notifies the sorting controller 45 of the unoccupied state of the system bus 41 or such that the sorting controller 45 forcibly requests the CPU 42 to free the bus.

In order to store the image data of dynamic images and still images, the main memory 43 includes a memory area for compressed image data and a memory area for decompressed image data which has been subjected to decompression-decoding. The main memory 43 also includes a memory area for graphics data such as a string of draw commands (such an area is hereinafter referred to as a packet buffer).

The packet buffer is used for the setting of a draw command string performed by the CPU 42 and the transfer of the draw command string to the drawing device portion and is shared by the CPU 42 and the drawing device portion 61. In order to allow parallel processing between the CPU 42 and the drawing device portion 61, in this embodiment, two packet buffers, i.e., a packet buffer for setting the draw command string and (hereinafter referred to as a setting packet buffer) and a packet buffer for transfer (hereinafter referred to as an execution packet buffer), are provided. When one of the buffers is used as the setting packet buffer, the other is used as the execution packet buffer and, when the execution using the execution packet buffer is finished, the functions of the two packet buffers are switched.

When the device (game machine) in the embodiment in FIG. 2 is powered up and a CD-ROM disc is loaded, the CPU 42 executes a program for a so-called initialization process in preparation for the execution of the game in the boot ROM 73. The data recorded on the CD-ROM disc is then fetched. At this time, decoding of user data is performed based on identification information ID included in user data in each sector of the CD-ROM disc to check the data. Based on the result of this check, the CPU 42 executes processing according to the reproduction data of the contents indicated by each ID.

Specifically, compressed image data, draw commands, and programs to be executed by the CPU 42 are read from the CD-ROM disc through the CD-ROM driver 53 and the CD-ROM decoder 52 and are loaded in the main memory 43 by the sorting controller 45. Among the loaded data, the information of the color conversion table is transferred to the area CLUT of the frame memory 63.

[Decompression and Transfer of Compressed Image Data]

Among the data input to the main memory 43, compressed image data is subjected to Huffman-code-decoding performed by the CPU 42 and, thereafter, is rewritten in the main memory 43 by the CPU 42. The sorting controller 45 transfers the image data which has been subjected to the Huffman-code-decoding from the main memory 43 to the image decompression device portion 51 through the FIFO buffer 54.

The decompressed image data is transferred by the sorting controller 45 to the main memory 43 through the FIFO buffer 55. The image decompression device portion 51 decompresses the image data on a macro-block basis as described above. As a result, the compressed data on a macro-block basis is transferred by the sorting controller 45 from the main memory 43 to the input FIFO buffer 54. Upon completion of decompress-decoding of one macro-block, the image decompression device portion 51 inputs the resultant decompressed image data in the FIFO buffer 55 for output and fetches the compressed data of the next macro-block from the input FIFO buffer 54 to perform decompress-decoding on it.

If the system bus 41 is unoccupied and the output FIFO buffer 55 of the image decompression device portion 51 is not empty, the sorting controller 45 transfers the decompressed image data for one macro-block to the main memory 43 and transfers the compressed image data for the next macro-block from the main memory 43 to the input FIFO buffer 54 of the image decompression device 51.

When a predetermined number of macro-blocks of decompressed image data have been accumulated in the main memory 43, the CPU 42 transfers the decompressed data to the frame memory 63 through the drawing device portion 61. If the decompressed data is transferred to the image memory area AD of the frame memory 63, it will be displayed as it is on the image monitor device 65 as a background dynamic image. Alternatively, the data may be transferred to the texture memory area AT of the frame memory 63. The image data in the texture memory area AT is used as a texture image for modifying a polygon.

[Processing and Transfer of Draw Command String]

Polygons which constitute faces of an object may be drawn in the order of decreasing depths in accordance with Z data which is information on three-dimensional depths to display an image having three-dimensional appearance on a two-dimensional image display surface. The CPU 42 creates a string of draw commands on the main memory 43, which causes the drawing device portion 61 to draw polygons in the order of decreasing depths as described above.

Figure 4:
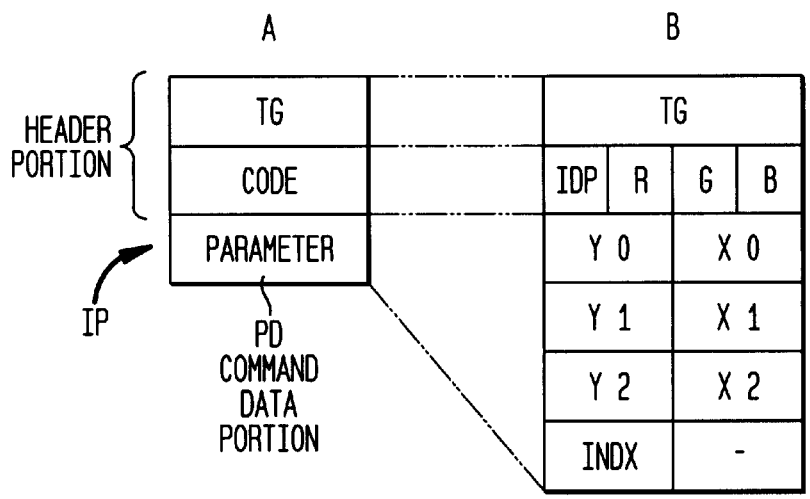
FIG. 4 illustrates an example of a data structure of a command according to an embodiment of the present invention.

An example of a data structure of a command IP in this embodiment is schematically shown at A in FIG. 4. This data structure is constituted by a header portion and a command data portion.

The header portion is constituted by a tag TG and a command identification code CODE. The address on the main memory 43 where the next draw command or control command is stored is written in the tag TAG. The command identification code CODE includes identification data IDP which identifies the command and, optionally, other information required for the command. Coordinate values and other parameters are written in the command data portion PD. Parameters to be written in such a command data portion PD are predetermined for each command IP.

The tag TG functions as follows. In computer graphics wherein a three-dimensional image is drawn on a two-dimensional screen, drawing must be performed in the order of decreasing depths. In order to do this, it is necessary to sequentially transfer draw commands in such a drawing order from the main memory 43 to the drawing device portion 61.

In the case of DMA transfer from the main memory 43 to the drawing device portion 61 using a conventional DMA controller, it is necessary to perform a process of rearranging the draw commands on the main memory 43 in the order in which they are to be executed, i.e., a process of changing the addresses where the draw commands are stored. However, this results in an increase in the processing time because of the time required for the rearranging process, making it difficult to perform real time processing.

Taking the above into consideration, in the present embodiment, draw commands include tags TG as described above which are rewritten by the CPU 42 in the order of the draw commands. The sorting controller 45 transfers the draw commands to the drawing device portion 61 according to the tags TG. The CPU 42 is thus able to perform a process of deciding the priorities for the display of polygon images on the main memory 43 without changing addresses of the draw commands themselves on the main memory 43.

An example of a polygon draw command is shown at B in FIG. 4. This polygon draw command is a command to draw a triangular polygon, and this is indicated by the contents of the identification data IDP of the command identification code CODE. When the inside of the polygon is to be mapped in one color, the color data for the three primary colors to be mapped (R, G. B) is included as other necessary information in the code CODE. The coordinates of the three vertices (X0, Y0), (X1, Y1), and (X2, Y2) are specified as the parameters of the command data. Further, the parameters include index data INDX for a semitransparent process, as described later.

The CPU 42 calculates the movements of the object and the viewpoint and creates draw commands on the main memory 43 based on control input from the user via the control pad 71. Then, it rewrites the tags TG of the draw commands in accordance with the drawing order using the Z data, thereby creating a string of draw commands on the main memory 43. At this time, the addresses of the commands on the main memory 43 is not changed, but only the tags are rewritten.

Figure 5:
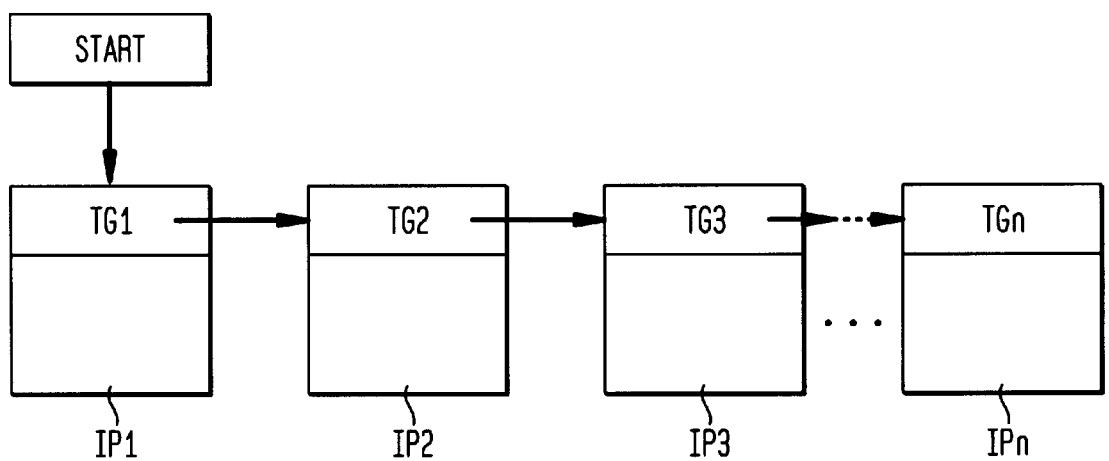
FIG. 5 illustrates an example of the transfer of a draw command according to an embodiment of the present invention.

When this draw command string is completed, as shown in FIG. 5, the sorting controller 45 transfers draw commands IP1, IP2, IP3, . . . , IPn one by one from the main memory 43 to the drawing device portion 61 in an order according to the tags TG1, TG2, TG3, . . . , TGn. Therefore, the FIFO buffer 62 only needs to have a capacity-to store one command.

Since the data transferred to the drawing device portion 61 has already been sorted, the drawing device portion 61 sequentially executes the commands IP1, IP2, IP3, . . . , IPn and stores the result in the drawing area AD of the frame memory 63.

When a polygon is drawn, data is sent to a gradient calculation unit of the drawing device portion 61 for a gradient calculation. A gradient calculation is a calculation to obtain the gradient of the plane of the mapping data for filling the inside of the polygon to be drawn. In the case of texturing, the polygon is filled with texture image data and, in the case of glow shading, the polygon is filled with brightness values.

Figure 6:
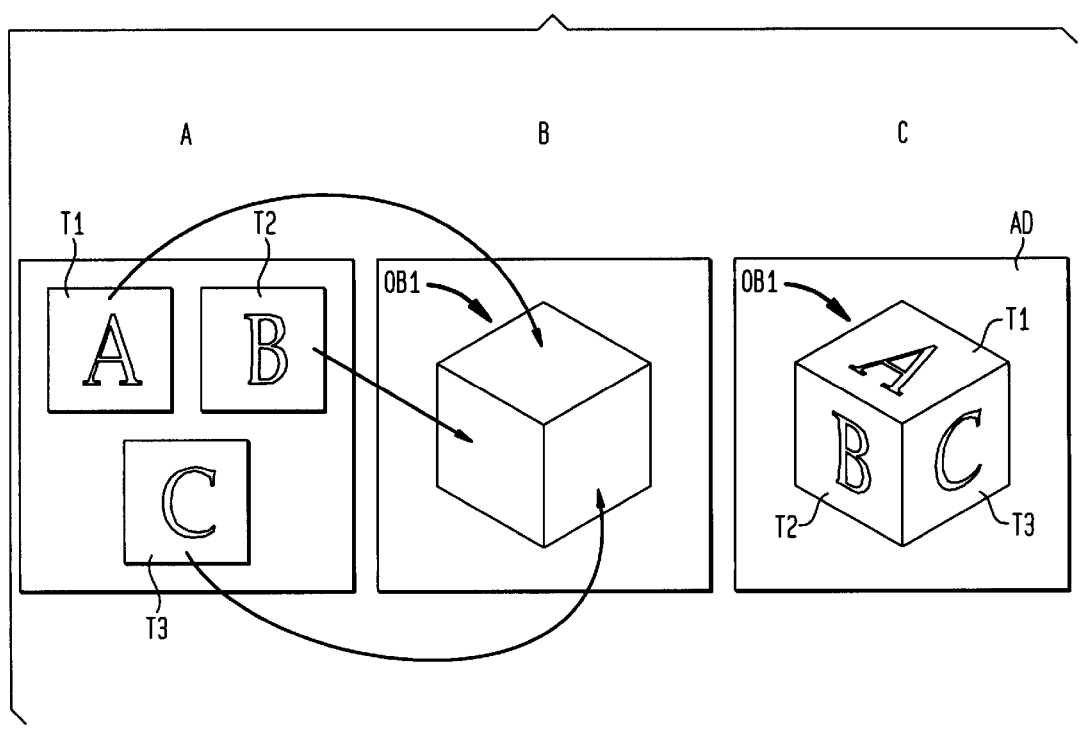
FIG. 6 illustrates texture mapping.

When a polygon that constitutes a face of an object is textured, the texture data in the texture area AT is subjected to two-dimensional mapping. For example, texture patterns T1, T2, and T3 as indicated at A in FIG. 6 are converted into coordinates on a two-dimensional screen so that they will fit the polygons that constitute respective faces of an object as shown at B in FIG. 6. As shown at C in FIG. 6, the texture patterns T1, T2, and T3 thus mapped are pasted on the respective faces of the object OB1. The product is placed in the image memory area AD and displayed on the display screen of the image display monitor 65.

In the case of still image texturing, texture patterns in the main memory 43 are transferred to the texture area AT of the frame memory 63 through the drawing device portion 61. The drawing device portion 61 pastes them on the polygon. This provides still image textures on the object. The data of such still image texture patterns can be recorded on the CD-ROM disc.

Further, it is possible to perform dynamic image texturing. In the case of dynamic image texturing, compressed dynamic image data from a CD-ROM disc is temporarily read into the main memory 43, as described above. Then, this compressed image data is sent to the image decompression device portion 51 which decompresses the image data.

The decompressed image data is sent to the texture area AT of the frame memory 63. Since the texture area AT is provided in the frame memory 63, the texture patterns themselves can be rewritten on a frame-by-frame basis. Thus, when dynamic images are sent to the texture area AT, the textures dynamically change as a result of the rewriting on a frame-by-frame basis. Texture mapping utilizing these dynamic images in the texture area will allow texturing with dynamic images.

As described above, by sending the image data decompressed by the image decompression device portion 51 to the image memory area AD of the frame memory 63, it is possible to display dynamic images as background images on the screen of the image monitor screen 65 and to fill the image memory area AD only with the images generated in accordance with the draw commands created by the CPU 42 to draw an image on the screen of the image display monitor 65. It is also possible to draw an object utilizing the polygon drawing by the CPU 62 over a still image obtained by decompressing image data from a CD-ROM disc on the image memory area AD.

[Description of a First Embodiment of a Semitransparent Process]

Figure 1:
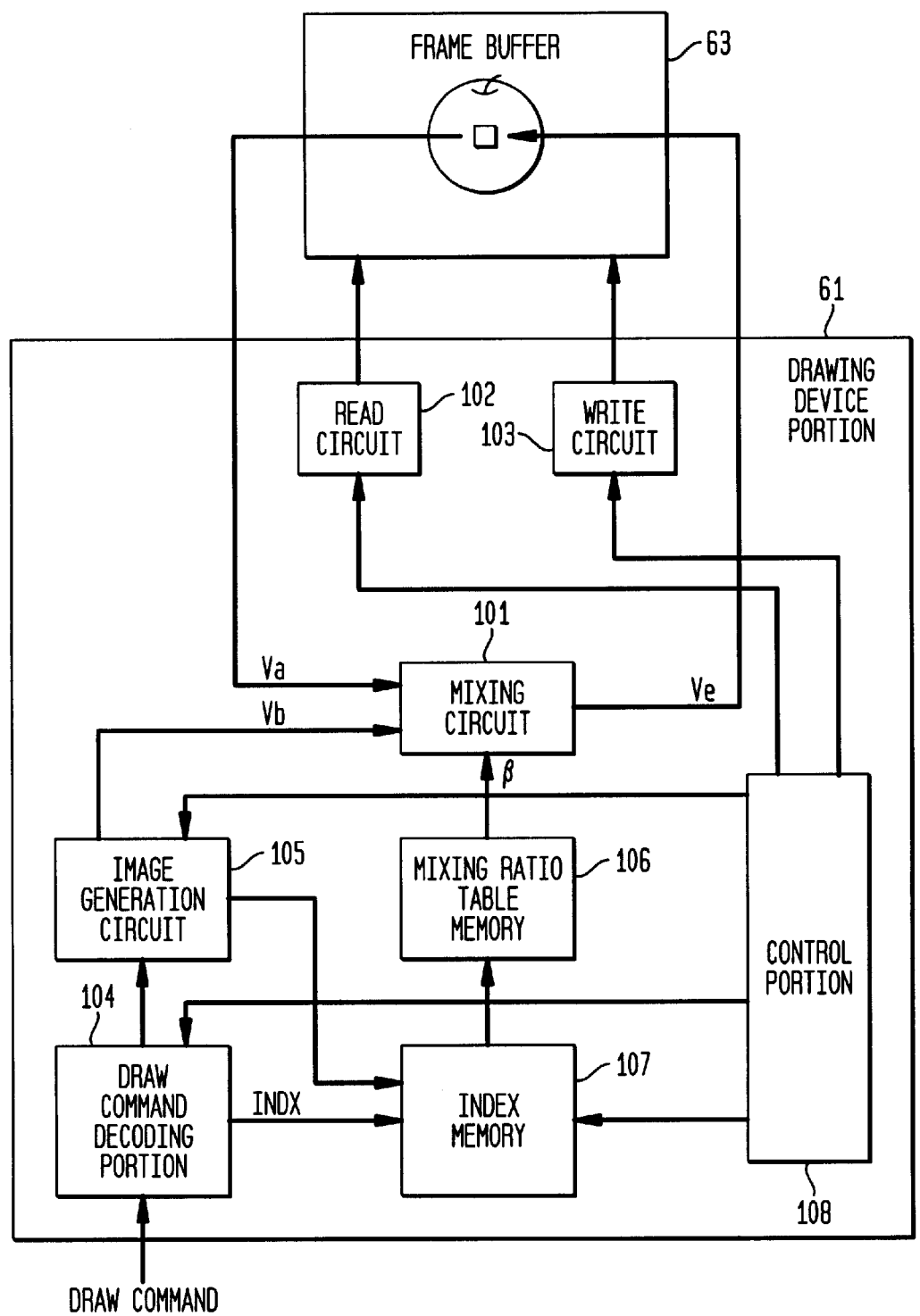
FIG. 1 is a block diagram of an embodiment of a major part of an image generation apparatus according to the present invention.

FIG. 1 is a block diagram of a first embodiment of the area of the drawing device portion 61.

Specifically, in order to preform a semitransparent process, the drawing device portion 61 includes a mixing circuit 101, a read circuit 102 for reading pixel data from a frame buffer 63, a write circuit for writing pixel data in the frame buffer 63, a draw command decoding portion 104 for decoding draw commands transferred to the drawing device portion 61, an image generation circuit 105 for generating an image according to the draw commands decoded by the draw command decoding portion 104, a mixing ratio table memory 106, an index memory 107 for storing index data which specifies the mixing ratios to be selected and supplied to the mixing circuit 101, and a control portion 108 for controlling the semitransparent process as a whole.

For example, mixing ratios $\beta$ as shown in FIG. 7 are stored in advance in the mixing ratio table memory 106. The mixing ratios $\beta$ prepared are mixing ratios which are frequently used for semitransparent processes. This mixing ratio table may be set in the memory 106 in advance. Alternatively, it may be transferred from a CD-ROM disc.

The above-described index data included in a draw command as shown in FIG. 3 serves as selection information for selecting the mixing ratios in this mixing ratio table. Specifically, the index data in a draw command corresponds to index numbers in the mixing ratio table shown in FIG. 7 (i.e., it corresponds to the addresses in the memory 106). Thus, the mixing ratios of those index numbers can be selected and read from the memory 106.

The index data in a draw command is extracted by the draw command decoding portion 104 and is supplied to and stored in the index memory 107. The index memory 107 stores the index data for each pixel that forms a part of an image generated by the image generation portion 105 based on pixel position information from the image generation portion 105.

In this case, a semitransparent process is performed as follows. The read circuit 102 reads the pixel data Va of a pixel position where drawing is to be performed from the frame buffer 63 and supplies it to the mixing circuit 101. The image generation portion 105 supplies the pixel data Vb to be drawn to the mixing circuit 101.

On the other hand, the index data of the pixel to be drawn is read from the index memory 107, and a mixing ratio $\beta$ is selected and read from the mixing ratio table 106 according to the read index data.

This mixing ratio $\beta$ is supplied to the mixing circuit 101. In the mixing circuit 101, the pixel data Va and Vb are mixed in the mixing ratio $\beta$. Specifically, a calculation "$(1-\beta)Va+\beta Vb=Ve$" is made to obtain mixed output image data Ve. The pixel data Ve as a result of the mixing is written by the write circuit 103 back in the same address position in the frame buffer 63 as that of the pixel data Va which has been read as described above.

In this case, the color of the previous pixel remains on the new pixel and is displayed as a semitransparent color in accordance with the mixing ratio $\beta$. If the mixing ratio $\beta=1$, the color is fully opaque and, if the mixing ratio $\beta=0$, the color is fully transparent.

[Description of a Second Embodiment of a Semitransparent Process]

Figure 8:
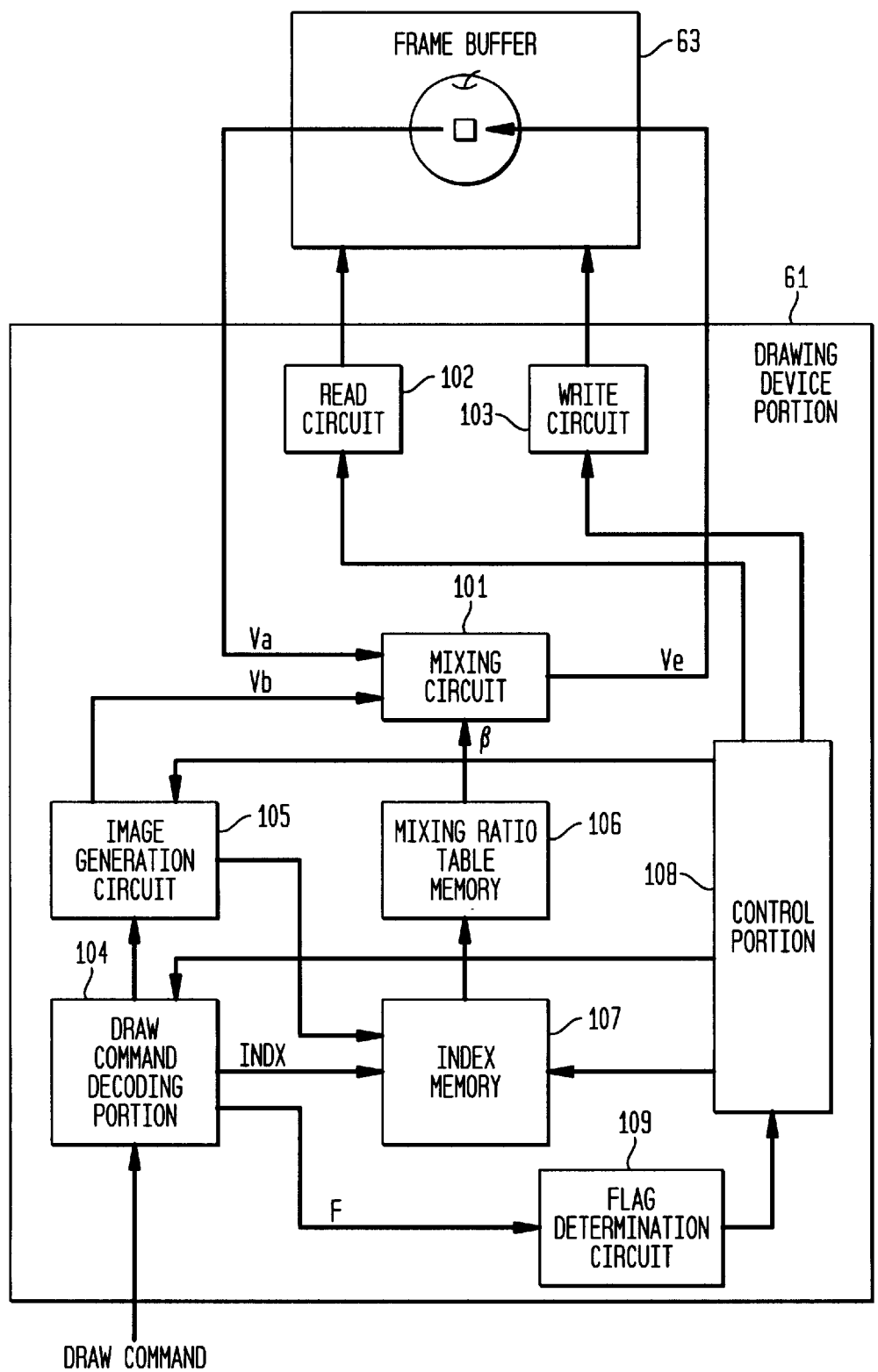
FIG. 8 is a block diagram of a major part of a second embodiment of the present invention.

FIG. 8 is a block diagram of a second embodiment of the area of the semitransparent process circuit in the drawing device portion 61. In this embodiment, the data of a draw command includes a flag that manifests a full transparent process or full opaque process.

Figures 9, 10:
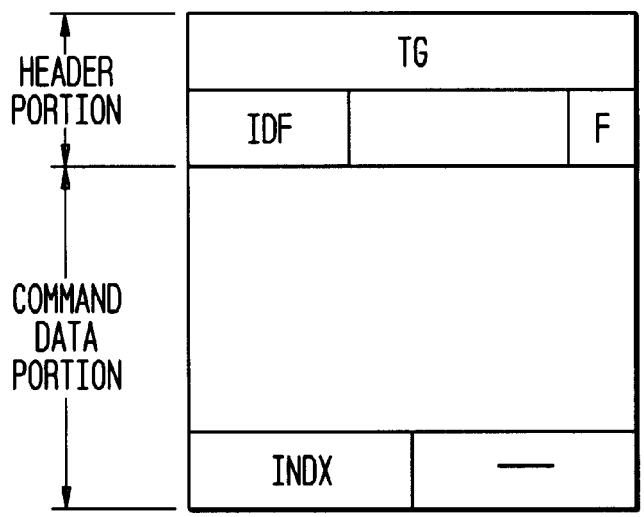
FIG. 9 illustrates an example of a draw command according to the second embodiment of the present invention.
FIG. 10 illustrates an example of a mixing ratio table according to the second embodiment of the present invention.
Figure 11:
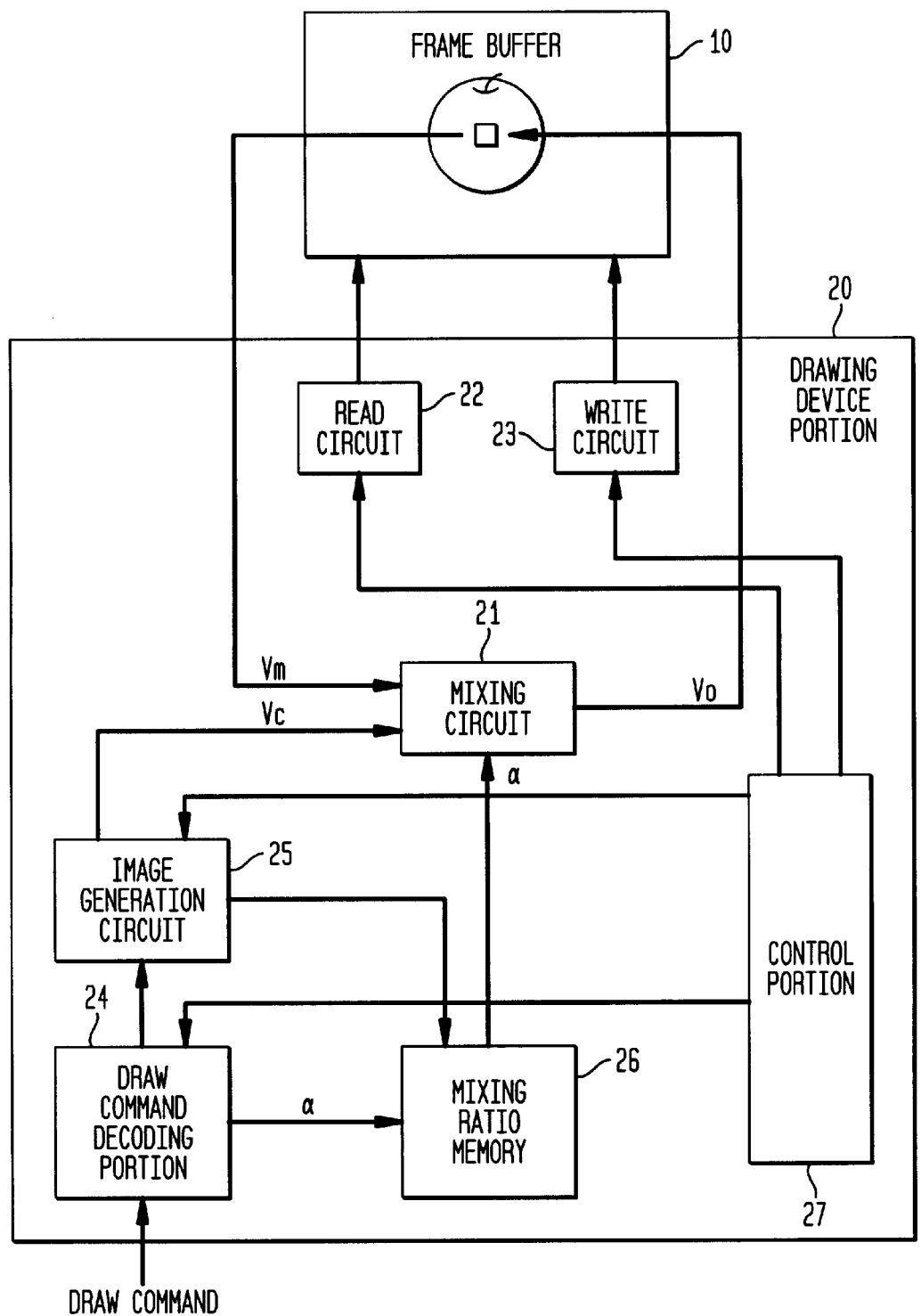
FIG. 11 is a block diagram to explain a semitransparent process circuit.

FIG. 9 shows an example of a draw command according to this embodiment. A draw command according to this embodiment includes the above-described flag F in the part of the command identification code CODE as data of one bit. Like the above-described first embodiment, index data INDX is included in the parameters of the command data.

In this embodiment, the mixing ratio table does not include the mixing ratios β=0 and β=1, as shown in FIG. 10.

As shown in FIG. 8, the configuration of the drawing device portion 61 for the semitranspsrent process includes a flag determination circuit 109 in addition to the circuit blocks in the embodiment shown in FIG. 1. The draw command decoding portion 104 extracts the flag F of a draw command and supplies it to the flag determination circuit 109. If the flag F=[1], the flag determination circuit 109 recognizes that the full opaque process is to be performed and supplied the result of determination to the control portion 108. If the flag F=[0], the flag determination circuit 109 recognizes that the full transparent process is to be performed and supplied the result of determination to the control portion 108. Flags F are continually supplied from the draw command decoding portion 104 to the flag determination circuit 109 during generation of images according to the relevant draw commands.

If the output of the determination of a flag F indicates that the full opaque process is to be performed, the control portion 108 disallows the read circuit 102 to read pixel data from the frame buffer 63. The control portion 108 performs control so that the pixel data from the image generation circuit 105 is supplied to the frame buffer 63 as it is through the mixing circuit 101 and controls the write circuit 103 so that it writes the pixel data in the pixel position to be drawn. Thus, the pixel has only the new pixel data, and the previous pixel is completely hidden by the new pixel.

If the output of the determination of a flag F indicates that the full transparent process is to be performed, the control portion 108 disallows the read circuit 102 to read pixel data from the frame buffer 63 and disallows the write circuit 103 to write. As a result, the previous pixel data remains as it is in the pixel position where drawing is attempted and is displayed in a fully transparent state.

While the embodiment shown in FIG. 8 is a combination of an aspect of the invention wherein mixing ratios are read from the mixing ratio table according to index data and another aspect which allows high speed processing, high speed processing can be achieved by a semitranspsrent process wherein a mixing ratio α as in the prior art is included in each draw command and a memory for storing such a mixing ratio α is used.

Although image data and application programs are recorded in a CD-ROM disc in the above-described embodiments, other recording media including magnetic discs and semiconductor memories such as memory cards may be used.

Various modifications to the present invention will become apparent to those skilled in the art from the foregoing description and accompanying drawings. Accordingly, the present invention is to be limited solely by the scope of the following claims.

What is claimed is:

1. An image generation apparatus wherein draw commands generated by a CPU are transferred to a drawing device which generates an image in a frame buffer by drawing sequentially in accordance with said draw commands, said drawing device comprising:

a read means for reading pixel data of an image which has been previously drawn from said frame buffer;

a mixing circuit for mixing the pixel data read from said frame buffer with pixel data of a corresponding position where a next drawing operation is to be performed in a specified mixing ratio;

a write means for writing the pixel data mixed in the corresponding pixel position in said frame buffer;

a mixing ratio memory for storing said mixing ratio supplied to said mixing circuit;

a flag determination means for extracting a flag associated with a draw command and for determining the state of said flag; and a control means for performing control based on a result of the flag determination means such that, if said flag is in one state, reading of pixel data from said frame buffer by said read means is omitted and the pixel data of the corresponding position where the next drawing operation is to be performed is written as it is in the corresponding pixel position in said frame buffer by said write means and such that, if said flag is in another state, the reading of the pixel data from said frame buffer by said read means and the writing into said frame buffer by said write means are omitted.

2. The image generation apparatus according to claim 1 further comprising a control input means, wherein said CPU generates said draw commands and sets said mixing ratio information in said draw commands in accordance with control input performed with said control input means.

3. The image generation apparatus according to claim 2, wherein said CPU generates said draw commands and sets said flag in a draw command in accordance with control input performed with said control input means.

4. The image generation apparatus according to claim 3 further comprising a disc reproducing portion, wherein said image data is reproduced from a disc loaded in said disc reproducing portion.

5. The image generation apparatus according to claim 4 further comprising a D-A conversion circuit for converting a digital signal into an analog signal, wherein a digital signal from said switching means is input to said D-A conversion circuit and is converted into an analog signal to be output.

6. The image generation apparatus according to claim 5, further comprising a common bus (system bus) for connecting signals from said control input means, drawing device portion, and disc reproducing portion.

7. The image generation apparatus according to claim 6, further comprising buffer memories provided between said drawing device portion and said common bus and between said disc reproducing portion and said common bus.

8. A method of generating an image wherein draw commands generated by a CPU are transferred to a drawing device which generates an image in a frame buffer by drawing sequentially in accordance with said draw commands, comprising the steps of:

reading pixel data of an image which has been previously drawn from said frame buffer;

mixing the pixel data read from said frame buffer and pixel data of a corresponding position where a next drawing operation is to be performed in a specified mixing ratio;

writing the mixed pixel data in the corresponding pixel position in said frame buffer;

storing said mixing ratio supplied to said mixing circuit;

extracting a flag from a draw command and determining the state of said flag; and performing control based on the result of a state of said flag such that, if said flag is in one state, the reading of the pixel data from said frame buffer by said read means is omitted and the pixel data of the corresponding position where the next drawing operation is to be performed is written as it is in the corresponding pixel position in said frame buffer by said write means and such that, if said flag is in another state, the reading of the pixel data from said frame buffer by said read means and the writing into said frame buffer by said write means are omitted.

9. The method of generating an image according to claim 8 further comprising step of providing a control input means, wherein said CPU generates said draw commands and sets said mixing ratio information in said draw commands in accordance with control input performed with said control input means.

10. The method of generating an image according to claim 9, wherein said CPU generates said draw commands and sets said flag in a draw command in accordance with control input performed with said control input means.

11. A method of generating an image comprising the steps of:

generating a plurality of draw commands, said plurality of draw commands including at least one flag;

identifying a state of said flag for a draw command; and maintaining a pixel without altering the pixel if the flag is in a first state, and rewriting the pixel without mixing if the pixel is in a second state.

12. A method of generating an image comprising the steps of:

generating a plurality of draw commands, said plurality of draw commands having a plurality of tags;

storing said draw commands in a memory; and rewriting the tags of at least 2 of said draw commands to change a sequence of execution for said draw commands.

* * * * *

UNITED STATES PATENT AND TRADEMARK OFFICE
CERTIFICATE OF CORRECTION

| | |
|---|---|
| PATENT NO. | : 6,392,643 B1 |
| APPLICATION NO. | : 08/414803 |
| DATED | : May 21, 2002 |
| INVENTOR(S) | : Makoto Furuhashi et al. |

It is certified that error appears in the above-identified patent and that said Letters Patent is hereby corrected as shown below:

Title Page,
Item [57], ABSTRACT, delete and substitute the following:
 -- An improved image generation apparatus employs draw commands including tags identifying an order in which the drawing commands are to be executed by a CPU and wherein the tags are rewritten to alter an order of execution. Additionally, the drawing device alternately employs the use of flags contained in the drawing commands to identify whether or not particular drawings processes are to be carried out. --.

Column 1,
Line 23, "herein after" should read -- hereinafter --.

Column 2,
Line 3, "a" should read -- $\propto$ --.

Column 5,
Line 1, after "example" insert -- of --.

Column 7,
Line 7, delete "and".

Column 10,
Lines 4 and 64, "Semitransparent" should read -- Semi-transparent --.
Lines 8, 19, 23, 41, 60 and 67, "semitransparent" should read -- semi-transparent --.

Column 11,
Line 48, "semitransparent" should read -- semi-transparent --.

UNITED STATES PATENT AND TRADEMARK OFFICE
CERTIFICATE OF CORRECTION

| | |
|---|---|
| PATENT NO. | : 6,392,643 B1 |
| APPLICATION NO. | : 08/414803 |
| DATED | : May 21, 2002 |
| INVENTOR(S) | : Makoto Furuhashi et al. |

It is certified that error appears in the above-identified patent and that said Letters Patent is hereby corrected as shown below:

<u>Column 13,</u>
Line 13, after "comprising" insert -- the --.

Signed and Sealed this

Twenty-seventh Day of June, 2006

JON W. DUDAS
*Director of the United States Patent and Trademark Office*